United States Patent [19]

Saridakis

[11] 4,119,771

[45] Oct. 10, 1978

[54] NEGATIVE COBALT ELECTRODE FOR AN ALKALINE STORAGE BATTERY

[75] Inventor: Nikolaus Saridakis, Brunswick, Germany

[73] Assignee: Volkswagenwerk Aktiengesellschaft, Wolfsburg, Germany

[21] Appl. No.: 690,048

[22] Filed: May 25, 1976

[30] Foreign Application Priority Data

Jun. 4, 1975 [DE] Fed. Rep. of Germany ....... 2524774

[51] Int. Cl.² ............................................. H01M 2/02
[52] U.S. Cl. .................................... 429/178; 429/218
[58] Field of Search .................... 429/178, 218, 209; 75/200, 201, 208 R, 214, 221, 222, 226

[56] References Cited

U.S. PATENT DOCUMENTS

| | | | |
|---|---|---|---|
| 3,311,507 | 3/1967 | Dittmann et al. | 429/45 |
| 3,513,034 | 5/1970 | Fischbach et al. | 429/218 X |
| 3,881,951 | 5/1975 | McCoy | 429/218 |
| 3,915,748 | 10/1975 | Weidlich | 429/218 X |
| 3,986,892 | 10/1976 | Ewe et al. | 429/218 |

Primary Examiner—Charles F. LeFevour
Attorney, Agent, or Firm—Spencer & Kaye

[57] ABSTRACT

A negative cobalt electrode for an alkaline storage battery comprises a layered structure including a center layer of compact, sintered cobalt powder forming an electrically conductive supporting framework, and outer layers of porous, sintered cobalt powder. The outer layers form the electrochemically active surfaces of the electrode. A method is provided for making the electrode.

8 Claims, 4 Drawing Figures

NEGATIVE COBALT ELECTRODE FOR AN ALKALINE STORAGE BATTERY

BACKGROUND OF THE INVENTION

The present invention relates to negative cobalt electrodes for alkaline storage batteries and to processes for manufacturing such electrodes.

Prior art negative electrodes produced of powdered cobalt by heat treatment for alkaline storage batteries suffer from the disadvantage that they generally are not sufficiently stable mechanically and thus are able to withstand only a relatively small number of charging and discharging cycles. Cobalt, however, due to its high storage capacity, is especially suitable as a negative electrode material in alkaline storage batteries used to drive vehicles. In batteries used to drive vehicles, however, mechanical stability of the electrodes is an extremely important factor because such storage batteries are charged and discharged relatively frequently. Moreover, in a battery used to drive a vehicle, a good voltage level must be realized during discharge.

SUMMARY OF THE INVENTION

It is therefore a primary object of the present invention to provide a negative cobalt electrode for an alkaline storage battery where the electrode is distinguished by very good mechanical stability and a good voltage level during discharge.

A further object of the present invention is to provide a process for manufacturing such an electrode.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides a negative cobalt electrode for an alkaline storage battery, the electrode having a layered structure including a center layer of a compact, sintered cobalt powder forming an electrically conductive supporting framework, and two outer layers, one on each side of the center layer, which form the actual electrochemically active surfaces of the electrode, and which are made of porous, sintered cobalt powder.

With its compact center layer, i.e., a denser center cobalt layer, the three-layer cobalt electrode according to the present invention has very good mechanical stability and good electrical conductivity. This mechanical stability is manifest, inter alia, in that such electrodes, when paired with conventional nickel positive elektrodes in a finished cell, have already withstood 1,200 cycles of rapid charges and discharges without becoming mechanically labile. The rapid discharges were here effected without noticeable worsening of the voltage level and storage capacity so that their suitability for use in electrically driven vehicles is evident.

In another aspect of the present invention, there is provided a method for producing a negative cobalt electrode for an alkaline storage battery comprising forming a three-layer structure in a mold including two outer layers each comprised of a cobalt powder mixed with a pore-forming salt and a center layer of pure cobalt powder between the two outer layers, subjecting the three-layer structure to a common pressing and sintering or only a sintering, and then removing the pore-forming salt from the outer layers by boiling.

In order to perform the method for producing the negative cobalt electrode the mold can be provided with a first outer layer of cobalt powder mixed with a pore-forming salt, a center layer of pure cobalt powder can then be placed on the first outer layer and thereafter a second outer layer of cobalt powder mixed with a pore-forming salt is placed on the center layer. The two outer layers and center layer are then subjected to a common pressing and sintering, and thereafter the pore-forming salt is removed from the outer layers by boiling.

Thus, one and the same cobalt powder is used for the manufacture of the electrode according to the present invention, it merely being intimately mixed with a pore-forming salt, preferably, potassium chloride, before the sintering process to form the outer electrochemically active layers and being used in pure form to form the center layer. The manufacture of the multi-layer electrode then takes place in a common process where the center layer, which is formed of only the pure cobalt powder, is sintered to form a compact cobalt body, while the outer layers, once the pore-forming salt has been removed by boiling, for example, in distilled water, form a relatively porous mass.

In a still further method of making the electrode of the present invention, each of three layers are separately prefabricated in separate process steps, and the prefabricated layers are then combined into a finished electrode body in a further process step.

It is to be understood that both the foregoing general description and the following detailed description are exemplary, but are not restrictive of the invention.

BRIEF DESCRIPTION OF THE DRAWING

The accompanying drawing, in which like numbers indicate like parts, illustrates examples of presently preferred embodiments of the invention and, together with the description, serves to explain the principles of the invention.

Of the drawing.

DESCRIPTION OF THE PREFERRED EMBODIMENTS OF THE INVENTION

Figure 1:
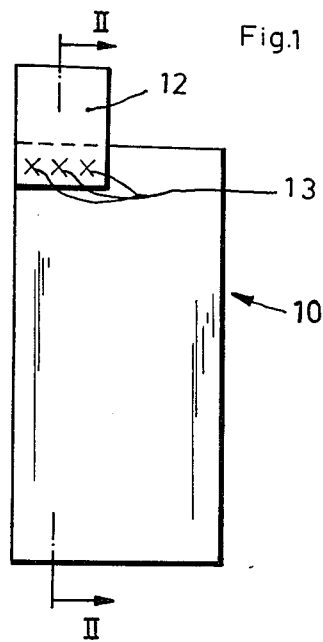
FIG. 1 is a top view of a negative cobalt electrode according to the present invention.

The electrode of the present invention contains two outer layers which generally are substantially identical to each other, and a center layer between the two outer layers. Preferably, the center layer which forms the electrically conductive supporting framework of the electrode of the present invention should have a thickness of about 0.1 to 0.5 mm. This thickness is sufficient to impart to electrodes of conventional size, sufficient mechanical stability and good electrical conductivity. The thickness of each outer layer generally is between 0.1 and 5 mm and the total thickness of the electrode generally is between about 0.3 to 10.5 mm.

According to a preferred embodiment of the invention, one or more current lugs for the input and output of the electrical current are fastened to an end of the electrode, such as by spot welding. These current lugs may also be welded directly to the three-layer electrode, or a portion of the compact cobalt center layer which forms the supporting framework may be extended past the two outer layers and made coextensive with the outer faces of the outer layers to form the area of the electrode where the lugs are to be fastened. To prepare a three-layer electrode having such a structure, pure cobalt powder can be filled in along one end of the electrode mold in the area where current lugs will later be fastened so that the compact cobalt center layer will there extend to the surface of the electrode and be coextensive with the outer faces of the outer layers. In another embodiment of the invention, a reinforcement in the form of a flat metallic body can be embedded in the electrode in the area where the lugs are to be fastened. The reinforcement in the form of a flat metallic body can be, for example, a nickel net or a nickel foil, and can be inserted into the mold together with the center layer in the area where the current lugs will later be fastened. This reinforcement prevents breaking of the electrode during welding-on of the current lugs by means of spot welding.

In a preferred embodiment of a method of producing an electrode according to the present invention, the actual manufacturing process comprises subjecting a three-layer structure, having a center layer of pure cobalt powder and two outer layers of cobalt powder mixed with a pore-forming salt, to a common prepressing step at a pressure of 0.5 to 1.0 t/cm$^2$, a subsequent sintering step for approximately one-half hour at temperatures in the range between 500° and 750° C, and a subsequent final pressing step in the hot state at a pressure of 1.3 to 2.2 t/cm$^2$. The above-mentioned cobalt electrodes described in the Summary of the Invention, which withstood 1,200 cycles of rapid charges and discharges, exhibited very good mechanical stability and discharged with a good voltage level and high storage capacity and were manufactured in this way.

For the manufacture of the electrodes according to the present invention, it has been found to be advantageous to utilize the pore-forming salt at a grain size of $\leq$ 70$\mu$. Preferably, one part of a pore-forming salt of a grain size between 45 and 50$\mu$ is mixed with two parts of cobalt powder to form a mixture which can be used to manufacture the outer layers. Preferably, potassium chloride is used as pore-forming salt in that mixture. Other pore-forming salts that can be used in place of or with potassium chloride are sodium chloride or sodium carbonate. The salt concentration in the powder mixture used to form the outer layers of the three-layer structure generally is between about 25 and 40 percentage of weight. The porosity achieved in the outer layers is then between about 55 to 75%.

Figure 2:
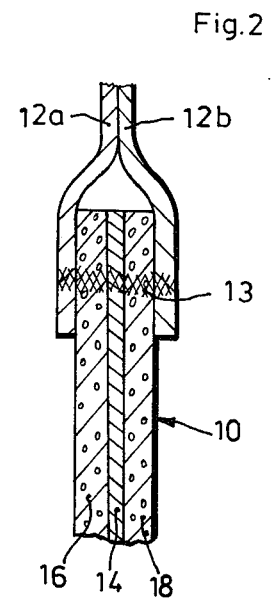
FIG. 2 is a cross-sectional view of the electrode of FIG. 1 taken along section lines II—II of FIG. 1.

Turning now to the drawing, there is shown in FIG. 1, a cobalt electrode 10 which has a current lug 12 fastened to its upper end by spot welds 13. Electrode 10, as can be seen in FIG. 2, has a three-layer structure including a compact, sintered cobalt center layer 14, and two porous, sintered cobalt outer layers 16 and 18, one on each side of layer 14. As best seen in FIG. 2, current lug 12 includes two sections 12a and 12b, with section 12a contacting the outer face of outer layer 16, and section 12b contacting the outer face of outer layer 18.

In the embodiment of FIG. 2, the three-layer structure of electrode 10 is continuous, i.e., all three layers extend into the area where current lug sections 12a and 12b are fastened to the electrode. In the embodiment of FIG. 2, the connection between the current lug sections 12a and 12b and the compact, center cobalt layer 14 is effected by spot welds 13.

Figure 3:
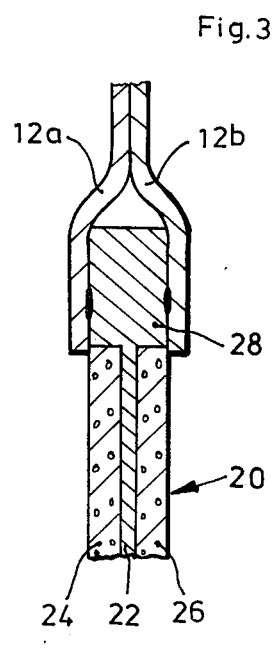
FIGS. 3 and 4 show two other embodiments of an electrode in accordance with the teachings of the present invention in cross-sectional views corresponding to that of FIG. 2.

Turning now to the embodiment of FIG. 3, there is shown an electrode 20 having a three-layer structure comprised of a compact, sintered cobalt center layer 22 and two outer porous, sintered cobalt layers 24 and 26. Center layer 22 extends past outer layers 24 and 26 as a compact sintered cobalt body 28 which is coextensive with the outer faces of outer layers 24 and 26. Compact body 28 is in the upper region of the electrode and forms the area of the electrode where current lug sections 2a and 2b are connected directly to the electrode in the layer which forms the electrically conductive supporting framework.

Figure 4:
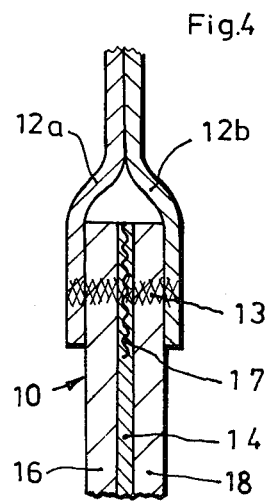

In the embodiment of FIG. 4, a flat metallic body 17, for example, of nickel net or a nickel foil, is inserted during fabrication together with the center compact cobalt layer 14 in the area where the current lugs will later be fastened so as to reinforce the end region of the electrode which is heavily stressed during welding-on of the current lugs.

The embodiments illustrated in the drawing are, of course, only examples of the electrode of the invention. In particular, the mode of attachment, as well as the structure of the current conducting lugs, may also be completely different than the embodiments shown here. For example, the reinforcement body 17 shown in FIG. 4 could also protrude over the edge of the electrode and one or a plurality of current lugs could then be fastened directly to this reinforcement body.

It is also conceivable, and should therefore be considered to be within the scope of the present invention, to vary the manufacturing process for the three-layer electrode of the present invention in that the individual layers are prefabricated in separate processes as separate entities, i.e., one compact cobalt body and two porous cobalt bodies, whereupon, in a further process step, these three partial bodies are then combined into the finished electrode body, for example, by sintering.

The following example is given by way of illustration to further explain the principles of the invention. This example is merely illustrative and is not to be understood as limiting the scope and underlying principles of the invention in any way. All percentages referred to herein are by weight unless otherwise indicated.

EXAMPLE I

In order to produce a negative cobalt electrode with outer dimensions of 7 $\times$ 14 cm, for example, 25 g cobalt powder were carefully mixed with 12.5 g potassium chloride salt of a grain size between 45 and 50$\mu$. Of this mixture, one-half was filled into a press mold of the electrode dimensions and smoothed out. Onto this first layer, 11 g pure cobalt powder, i.e., not mixed with potassium chloride, was placed and thereon the second half of the cobalt powder mixed with the potassium chloride. This three-layer filling was prepressed at about 0.7 t/cm$^2$, then sintered for half an hour in a furnace at about 730° C, and therefter pressed again in the hot state at a pressure of 1.7 t/cm$^2$. The potassium chloride salt was then removed by boiling in distilled water. The finished electrode, to whose upper edge a current lug was fastened by spot welding, had a total thickness of about 1.0 mm, with the center compact cobalt layer being about 0.20 mm thick. During a 1-hour discharge, this electrode had an Ah capacity of about 200 to 250

Ah/kg at about −810 mV, measured against a Hg/HgO reference electrode. Compared to conventional lead storage batteries and when combined into cells with nickel or air electrodes, such cobalt negative electrodes produce approximately twice as good a specific energy of about 36 Wh/kg in a 1-hour discharge. The realizable number of cycles is much greater than for the lead storage batteries.

EXAMPLE II

In another method to produce a negative cobalt electrode the individual layers of the three-layer electrode were fabricated in separate process steps as partial bodies. For that purpose 25 g cobalt powder were carefully mixed with 12.5 g potassium chloride salt of a grain size between 45 and 50$\mu$ and the mixture was then divided into two halves. Each half was filled into a press mold with the electrode dimensions of 7 × 14 cm and pressed for a quarter of an hour at a temperature of about 700° C and at a pressure of about 1.3 t/cm$^2$ to a partial electrode body with a thickness of about 0.45 mm. 15 g pure cobalt powder was also filled into the press mold and pressed at the same conditions to a compact partial electrode body with a thickness of about 0.35 mm. The three prefabricated partial bodies were then placed into the press mold one upon another the body fabricated of the pure cobalt powder lying between the two other bodies fabricated of the mixture of powder cobalt and potassium chloride salt. The three partial bodies were pressed for half an hour at a temperature of about 730° C and at a pressure of about 1.7 t/cm$^2$ to a finished electrode body with a total thickness of about 1.1 mm. The potassium chloride salt was then removed by boiling in distilled water. The finished electrode, to which upper edge a current lug was fastened by spot welding, had nearly the same Ah capacity and mechanical stability like the electrode of the example I.

It will be understood that the above description of the present invention is susceptible to various modifications, changes and adaptations, and the same are intended to be comprehended within the meaning and range of equivalents of the appended claims.

What is claimed is:

1. A negative cobalt electrode for an alkaline storage battery, comprising a layered structure including a center layer of compact, sintered cobalt powder forming an electrically conductive supporting framework, and two outer layers of porous, sintered cobalt powder, one on each side of the center layer, and forming the electrochemically active surfaces of the electrode, with the center layer being denser than the two outer layers.

2. The cobalt electrode as defined in claim 1 wherein the center layer has a thickness of about 0.1 to 0.5 mm.

3. The cobalt electrode as defined in claim 1 including a current lug fastened to an end of the electrode to supply and discharge electrical current.

4. The cobalt electrode as defined in claim 3 wherein the current lug is fastened by spot welding.

5. The cobalt electrode as defined in claim 3 wherein a portion of the compact cobalt center layer forming the supporting framework extends past the two outer layers, is coextensive with the outer faces of the outer layers, and forms the area where the current lug is fastened.

6. The cobalt electrode as defined in claim 3 including a reinforcement, in the form of a flat metallic body, embedded in the electrode in the area of the electrode where the current lug is fastened.

7. The cobalt electrode as defined in claim 6 wherein the flat metallic body is embedded in the center layer.

8. The cobalt electrode as defined in claim 3 wherein a plurality of current lugs are fastened to the electrode.

* * * * *